United States Patent

Park et al.

(10) Patent No.: US 9,074,650 B2
(45) Date of Patent: Jul. 7, 2015

(54) PISTON ASSEMBLY OF SHOCK ABSORBER

(71) Applicant: MANDO CORPORATION, Gyeonggi-do (KR)

(72) Inventors: Wan Sang Park, Jeonbuk (KR); Tae Ju Kim, Jeonbuk (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 13/729,686

(22) Filed: Dec. 28, 2012

(65) Prior Publication Data

US 2013/0168195 A1 Jul. 4, 2013

(30) Foreign Application Priority Data

Dec. 30, 2011 (KR) .................. 10-2011-0147538

(51) Int. Cl.
*F16F 9/32* (2006.01)

(52) U.S. Cl.
CPC .................... *F16F 9/3214* (2013.01)

(58) Field of Classification Search
CPC ..................................... F16F 9/3214
USPC .......... 188/322.15, 322.22, 322.13, 313, 283; 92/172, 181 P
See application file for complete search history.

(56) References Cited

U.S. PATENT DOCUMENTS

| | | | | |
|---|---|---|---|---|
| 5,259,294 A * | 11/1993 | May | | 92/181 P |
| 6,397,987 B1 * | 6/2002 | Pesch et al. | | 188/322.22 |
| 6,460,664 B1 * | 10/2002 | Steed et al. | | 188/322.15 |
| 6,481,336 B2 * | 11/2002 | May | | 92/185 |
| 7,178,237 B2 * | 2/2007 | Casellas et al. | | 29/888.047 |
| 7,584,829 B2 * | 9/2009 | Schmidt | | 188/322.15 |
| 8,157,065 B2 * | 4/2012 | Ashiba | | 188/322.15 |
| 2009/0000891 A1 * | 1/2009 | Kouyama et al. | | 188/322.15 |
| 2009/0260938 A1 * | 10/2009 | Hikosaka | | 188/322.15 |
| 2013/0037361 A1 * | 2/2013 | Park et al. | | 188/322.15 |

FOREIGN PATENT DOCUMENTS

| | | |
|---|---|---|
| CN | 101936358 A | 1/2011 |
| EP | 557548 A1 * | 9/1993 |
| JP | 2005188602 A * | 7/2005 |
| JP | H08261268 A | 7/2007 |
| JP | 2007-198515 | 8/2007 |
| JP | 201138626 A | 2/2011 |
| KR | 1020070073213 A | 10/1996 |

OTHER PUBLICATIONS

Chinese Office Action dated Jul. 24, 2014 corresponding to Chinese Patent Application No. 201210579723.2; 11 pages.

* cited by examiner

*Primary Examiner* — Thomas J Williams
*Assistant Examiner* — Mariano Sy
(74) *Attorney, Agent, or Firm* — Lowe Hauptman & Ham, LLP (57) ABSTRACT

Disclosed herein is a piston assembly of a shock absorber which ensures easy and prompt connection of components in the correct positions in assembling the piston assembly of a shock absorber by forming a seating unit between a piston body and a compression retainer and between the piston body and a tension retainer.

6 Claims, 9 Drawing Sheets

PISTON ASSEMBLY OF SHOCK ABSORBER

CROSS-REFERENCE TO RELATED APPLICATION(S)

This application claims the benefit of Korean Patent Application No. 2011-0147538, filed on Dec. 30, 2011 in the Korean Intellectual Property Office, the disclosure of which is incorporated herein by reference.

BACKGROUND

1. Field

Embodiments of the present invention relate to a piston assembly of a shock absorber which ensures easy and prompt connection of components in the correct positions in assembling the piston assembly of a shock absorber.

2. Description of the Related Art

A shock absorber, which is generally used to improve ride comfort and protect cargo and vehicle components, includes a cylinder filled with a working fluid (oil), a piston rod connected to a vehicle body and adapted to reciprocate, and a piston valve coupled to the lower end of the piston rod to slide within the cylinder and control flow of the working fluid.

Recently, there has been increased use of a sandwich type piston, which increases the freedom of degree of tuning, for a piston valve.

The sandwich type structure tends to have complicated fluid passages inside the piston, resulting in increased production costs and decreased productivity.

SUMMARY

Therefore, it is an aspect of the present invention to provide a piston assembly of a shock absorber which ensures easy and prompt connection of components in the correct positions in assembling the piston assembly of a shock absorber.

Additional aspects of the invention will be set forth in part in the description which follows and, in part, will be obvious from the description, or may be learned by practice of the invention.

In accordance with one aspect of the present invention, a piston assembly of a shock absorber provided on a vehicle may include a piston body provided with a center penetrated by a piston rod reciprocating in a cylinder and a repetitive pattern in which a compression fluid passage having an inlet at a lower end thereof and a tension fluid passage having an inlet at an upper end thereof alternately penetrate the piston body, wherein the inlets of the compression fluid passage and the tension fluid passage have larger cross-sectional areas than corresponding outlets of the compression fluid passage and the tension fluid passage, and the compression fluid passage and the tension fluid passage are kept open, a compression retainer seated at an upper portion of the piston body and penetrated by a connection hole corresponding to the compression fluid passage, a tension retainer seated at a lower portion of the piston body and penetrated by a connection hole corresponding to the tension fluid passage, and a seating unit formed between the compression retainer and the piston body and between the piston body and the tension retainer to determine positions at which the compression retainer and the tension retainer are coupled to the piston body.

The seating unit includes a first seating assembly provided at an edge of a first rod hole formed at the center of the piston body and penetrated by the piston rod and at an edge of a second rod hole formed at the center of the compression retainer to face the edge of the first rod hole and penetrated by the piston rod, the edge of the second rod hole facing the edge of the first rod hole, and a second seating assembly provided at the edge of the first rod hole and at an edge of a third rod hole formed at a center of the tension retainer and penetrated by the piston rod, the edge of the third rod hole facing the edge of a first rod hole.

A contact surface of the compression retainer arranged between the second rod hole and the connection hole of the compression retainer to adjoin the piston body is provided with a raised step protruding toward the piston body to have a stepped shape, and a contact surface of the tension retainer arranged between the third rod hole and the connection hole of the tension retainer to adjoin the piston body is provided with a raised step protruding toward the piston body to have a stepped shape.

The first seating assembly includes at least one first protrusion protruding from the edge of the first rod hole toward the compression retainer, a first ring groove depressed along the edge of the second rod hole to accommodate the first protrusion, and a plurality of first auxiliary protrusions arranged along the first ring groove to be spaced apart from each other by a distance corresponding to a distance between both ends of the first protrusion and protrude toward the piston body.

The second seating assembly includes at least one second protrusion protruding from the edge of the first rod hole toward the tension retainer, a second ring groove depressed along the edge of the third rod hole to accommodate the second protrusion, and a plurality of second auxiliary protrusions arranged along the second ring groove to be spaced apart from each other by a distance corresponding to a distance between both ends of the second protrusion and protruding toward the piston body.

The first seating assembly includes a plurality of first protrusions protruding from the edge of the first rod hole toward the compression retainer, a first ring groove depressed along the edge of the second rod hole to accommodate the first protrusions, and a plurality of first auxiliary protrusions arranged along the first ring groove to be spaced apart from each other by a distance corresponding to a distance between both ends of the first protrusion and protrude toward the piston body.

The second seating assembly includes a plurality of second protrusions protruding from the edge of the first rod hole toward the tension retainer, a second ring groove depressed along the edge of the third rod hole to accommodate the second protrusions, and a plurality of second auxiliary protrusions arranged along the second ring groove to be spaced apart from each other by a distance corresponding to a distance between both ends of the second protrusion and protrude toward the piston body.

The first seating assembly includes a first ring groove depressed along the edge of the first rod hole, a plurality of first auxiliary protrusions arranged along the first ring groove to be equally spaced apart and protrude toward the compression retainer, and at least one first protrusion formed to have a shape corresponding to a space between neighboring first auxiliary protrusions from the plurality of first auxiliary protrusions and protruding from the edge of the second rod hole toward the piston body to be accommodated in the first ring groove.

The second seating assembly includes a second ring groove depressed along the edge of the first rod hole, a plurality of second auxiliary protrusions arranged along the second ring groove to be equally spaced apart and protrude toward the extension retainer, and at least one second protrusion formed to have a shape corresponding to a space between neighboring second auxiliary protrusions from the plurality of second auxiliary protrusions and protruding from the edge of the third rod hole toward the piston body to be accommodated in the second ring groove.

The first seating assembly includes a first ring groove depressed along the edge of the first rod hole, a plurality of first auxiliary protrusions arranged along the first ring groove to be equally spaced apart and protrude toward the compression retainer, and a plurality of first protrusions formed to have a shape corresponding to a space between neighboring first auxiliary protrusions from the plurality of first auxiliary protrusions and protruding from the edge of the second rod hole toward the piston body to be accommodated in the first ring groove.

The first seating assembly includes a second ring groove depressed along the edge of the first rod hole, a plurality of second auxiliary protrusions arranged along the second ring groove to be equally spaced apart and protrude toward the extension retainer, and a plurality of second protrusions formed to have a shape corresponding to a space between neighboring second auxiliary protrusions from the plurality of the second auxiliary protrusions and protruding from the edge of the third rod hole toward the piston body to be accommodated in the second ring groove.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

Figure 1:
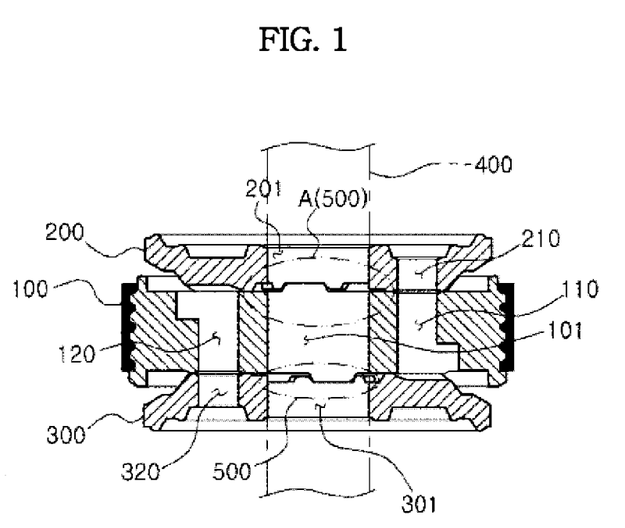
FIG. 1 is a conceptual cross-sectional view illustrating a piston assembly of a shock absorber according to an exemplary embodiment of the present invention.

FIG. 1 is a conceptual cross-sectional view illustrating a piston assembly of a shock absorber according to an exemplary embodiment of the present invention.

As shown in FIG. 1, a seating unit 500 is formed between a piston body 100 and a compression retainer 200 and between the piston body 100 and a tension retainer 300.

The center of the piston body 100 is penetrated by a piston rod 400 reciprocating in a cylinder (not shown), and a compression fluid passage 110 having an inlet at the lower end thereof and a tension fluid passage 120 having an inlet at the upper end thereof alternately penetrate the piston body 100.

Here, the inlets of the compression fluid passage 110 and the tension fluid passage 120 have larger cross-sectional areas than the corresponding outlets of the compression fluid passage 110 and the tension fluid passage 120, and the compression fluid passage 110 and the tension fluid passage 120 are kept open.

The compression retainer 200 is seated at the upper portion of the piston body 100, and penetrated by a connection hole 210 corresponding to the compression fluid passage 110.

The tension retainer 300 is seated at the lower portion of the piston body 100, and penetrated by a connection hole 320 corresponding to the tension fluid passage 120.

The seating unit 500 is formed between the compression retainer 200 and the piston body 100 and between the piston body 100 and the tension retainer 300 to determine the positions at which the compression retainer 200 and the tension retainer 300 are coupled to the piston body 100

Accordingly, when the compression retainer 200 and the tension retainer 300 are respectively coupled to the top and bottom of the piston body 100, they are guided to correct positions by the seating unit 500, and thus easy and prompt assembly operation may be performed.

In addition to the illustrated embodiment as above, various embodiments described below are also applicable.

Figure 2:
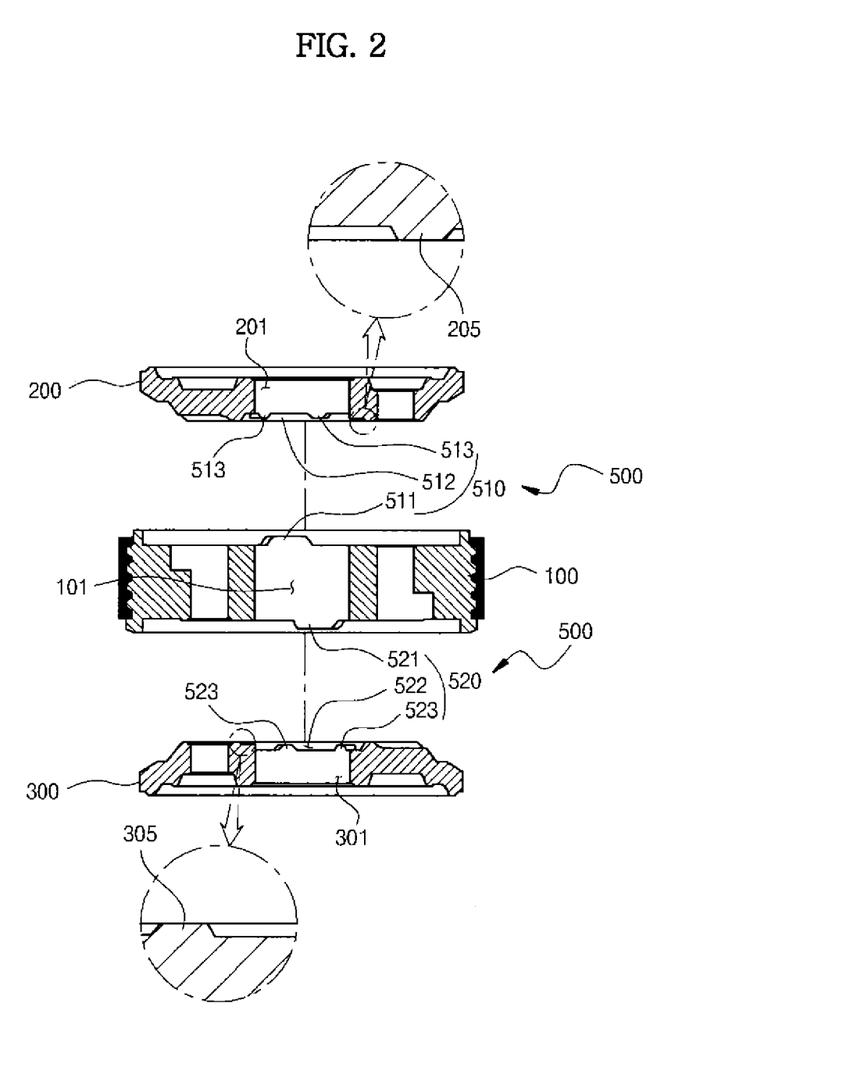
FIGS. 2 to 5 are conceptual exploded cross-sectional views illustrating a piston assembly of a shock absorber according to various embodiments of the present invention.

The seating unit 500 formed between the piston body 100 and the compression retainer 200 and between the piston body 100 and the tension retainer 300 as described above includes a first seating assembly 510 and a second seating assembly 520, as shown in FIG. 2.

The first seating assembly 510 is provided at an edge of a first rod hole 101 formed at the center of the piston body 100 and penetrated by the piston rod 400 and at the edge of a second rod hole 201 formed at the center of the compression retainer 200 and penetrated by the piston rod 400, with the edge of the second rod hole 201 facing the edge of the first rod hole 101. The first seating assembly 510 serves to seat the compression retainer 200 at a correct position on the piston body 100.

The second seating assembly 520 is provided at the edge of the first rod hole 101 and at the edge of a third rod hole 301 formed at the center of the tension retainer 300 and penetrated by the piston rod 400, with the edge of the first rod hole 101 and the edge of the third rod hole 301 facing each other. The second seating assembly 520 serves to couple the piston body 100 with the tension retainer at a correct position.

In the structure of the first seating assembly 510, a first protrusion 511 is seated between first auxiliary protrusions 513 protruding from a first ring 512.

At least one first protrusion 511 protrudes from the edge of the first rod hole 101 toward the compression retainer 200.

The first ring groove 512 is formed to be depressed along the edge of the second rod hole 201 to accommodate the first protrusion 511.

The first auxiliary protrusions 513 are arranged along the first ring groove 512 to be spaced apart from each other by a distance corresponding to the distance between both ends of the first protrusion 511 and protrude toward the piston body 100.

Accordingly, when the compression retainer 200 is placed on the piston body 100, the first protrusion 511 is positioned and seated between the first auxiliary protrusions 513 by weight of the compression retainer 200.

In the structure of the second seating assembly 520, a second protrusion 521 is coupled between second auxiliary protrusions 523 protruding from a second ring 522.

At least one second protrusion 521 protrudes from the edge of the first rod hole 101 toward the tension retainer 300.

The second ring groove 522 is formed to be depressed along the edge of the third rod hole 301 to accommodate the second protrusion 521.

The second auxiliary protrusions 523 are arranged along the second ring groove 522 to be spaced apart from each other by a distance corresponding to the distance between both ends of the second protrusion 521 and protrude toward the piston body 100.

Accordingly, when the tension retainer 300 is placed as shown in FIG. 2 and the piston body 100 is mounted on the tension retainer 300, the second protrusion 521 is positioned and coupled between the second auxiliary protrusions 523 by weight of the piston body 100.

When the tension retainer 300, piston body 100 and compression retainer 200 are fitted into the piston rod in this order or in the reverse order, correct positions of the components may be determined.

In addition, the piston assembly of a shock absorber as above provides a structure ensuring mountability of components in coupling the piston body 100 with the compression and tension retainers 200 and 300. With reference to the enlarged view in FIG. 2, a raised step 205 protruding toward the piston body 100 is formed on the surface of the compression retainer 200 facing the piston body 100, between the second rod hole 201 and the connection hole 210. That is, the surface of the compression retainer 200 contacting the piston body 100 is provided with a stepped shape.

Also, a raised step 305 protruding toward the piston body 100 is formed on the surface of the tension retainer 300 facing the piston body 100, between the third rod hole 301 and the connection hole 320. That is, the surface of the tension retainer 300 contacting the piston body 100 is provided with a stepped shape.

As the compression retainer 200 and the tension retainer 300 are provided with the raised steps 205 and 305, mountability of the compression retainer 200 and tension retainer 300 is ensured in coupling the compression retainer 200 and tension retainer 300 with the piston body 100 by preventing interference with each other. Thereby, assembly operation is facilitated by weight and rotation of the components integrated into the assembly, and thus assembling in an automated assembly line may be improved. That is, productivity may be improved.

The stepped structure of the compression retainer 200 and tension retainer 300, which is shown in an enlarged view in FIG. 2 but not in FIGS. 3 to 9, should be construed as being applicable to various embodiments which will be described below.

Figure 3:
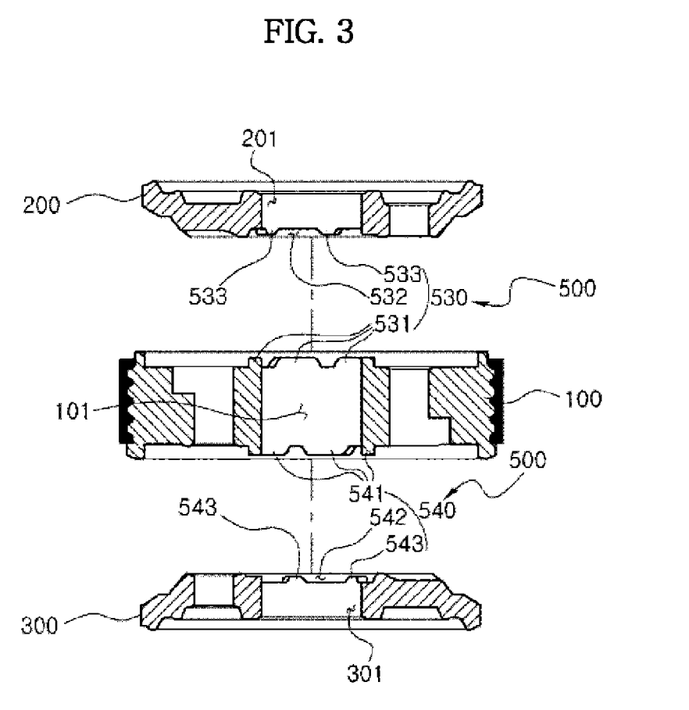

According to another embodiment of the present invention, as shown in FIG. 3, a first seating assembly 530 may be provided such that a plurality of first protrusions 531 equally spaced apart and protruding from the edge of the first rod hole 101 toward the compression retainer 200 is coupled with and supported by the first ring groove 532 which is depressed along the edge of the second rod hole 201, and each of the first protrusions 531 is disposed between a plurality of first auxiliary protrusions 533 which are spaced apart from each other along the first ring groove 532 by a distance corresponding to the distance between both ends of the first protrusion 531 and protrude toward the piston body 100.

Also, the second seating assembly 540 may be provided such that a plurality of second protrusions 541 equally spaced apart and protruding from the edge of the first rod hole 101 toward the tension retainer 300 is coupled with and supported by the second ring groove 542 which is depressed along the edge of the third rod hole 301 to accommodate the second protrusions 541, and each of the second protrusions 541 is disposed between a plurality of second auxiliary protrusions 543 which are spaced apart from each other along the second ring groove 542 by a distance corresponding to the distance between both ends of the second protrusion 541 and protrude toward the piston body 100.

Figure 4:
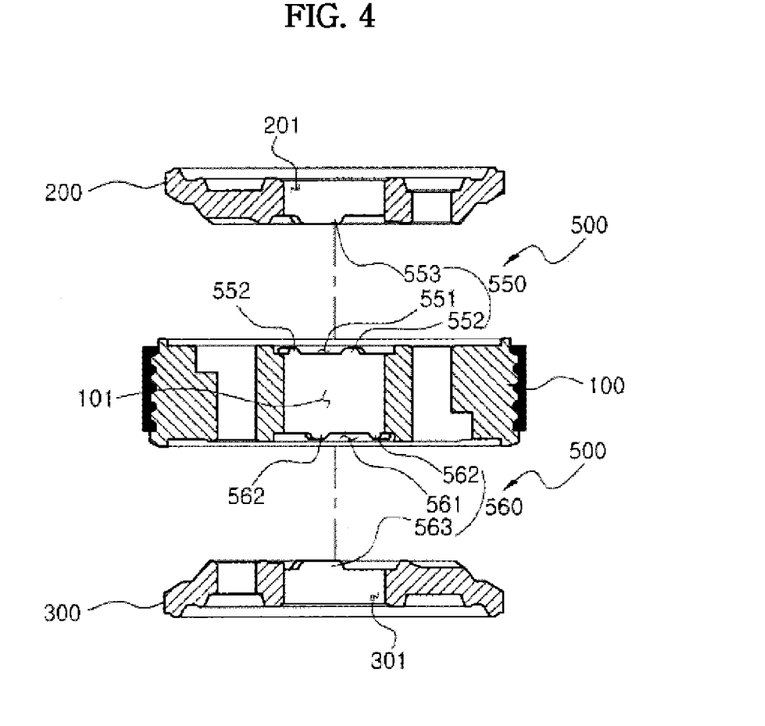

According to another embodiment of the present invention, as shown in FIG. 4, a first seating assembly 550 may be provided such that a first protrusion 553 is coupled between neighboring first auxiliary protrusions 552 from a plurality of first auxiliary protrusions 552 arranged to be equally spaced apart along a first ring groove 551 depressed along the edge of the first rod hole 101 and protrude toward the compression retainer 200.

The first protrusion 553 is formed to have a shape corresponding to the space between the neighboring first auxiliary protrusions 552 from the plurality of first auxiliary protrusions 552. At least one of the first protrusions 553 protrudes from the edge of the second rod hole 201 toward the piston body 100 to be accommodated in the first ring groove 551.

A second seating assembly 560 may be provided such that a second protrusion 563 is coupled between neighboring second auxiliary protrusions 562 from a plurality of second auxiliary protrusions 562 arranged to be equally spaced apart along a second ring groove 561 depressed along the edge of the first rod hole 101 and protrude toward the tension retainer 300.

The second protrusion 563 is formed to have a shape corresponding to the space between the neighboring second auxiliary protrusions 562 from the plurality of second auxiliary protrusions 562. At least one of the second protrusions 563 protrudes from the edge of the second rod hole 301 toward the piston body 100 to be accommodated in the second ring groove 561.

Figure 5:
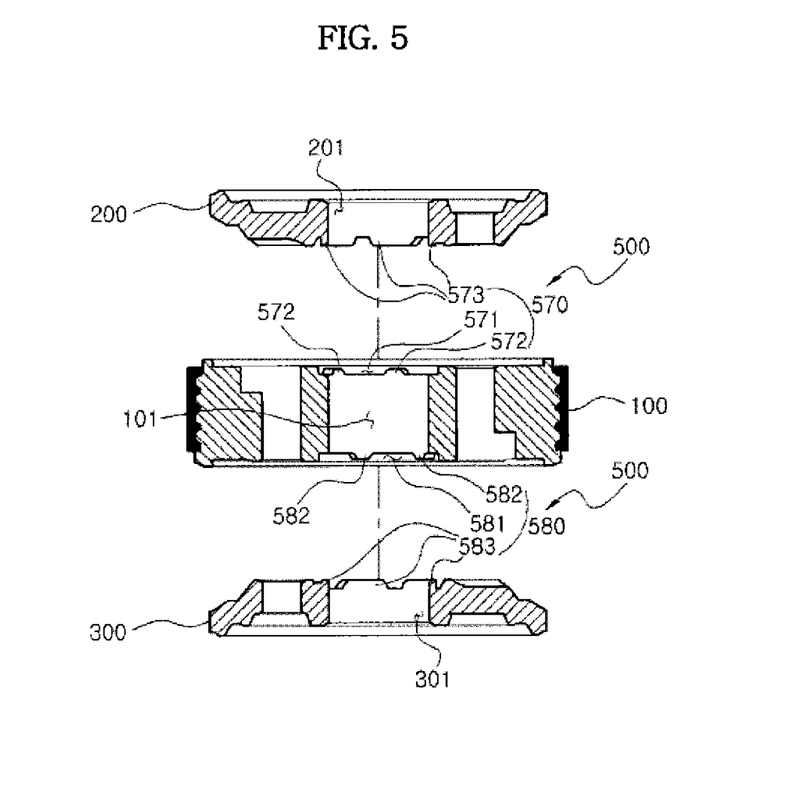

In the meantime, as shown in FIG. 5, a first seating assembly 570 includes a first ring groove 571 depressed along the edge of the rod hole 101, and a plurality of first auxiliary protrusions 572 arranged to be equally spaced apart along the first ring groove 571 and protrude toward the compression retainer 200.

The first seating assembly 570 includes a plurality of first protrusions 573 which are formed in a shape corresponding to a space between a first auxiliary protrusion 572 and a neighboring first auxiliary protrusion 572, and arranged to be equally spaced apart and protrude from the edge of the second rod hole 201 toward the piston body 100 to be accommodated in the first ring groove 571.

A second seating assembly 580 includes a second ring groove 581 depressed along the edge of the rod hole 101, and a plurality of second auxiliary protrusions 582 arranged along the second ring groove 581 to be equally spaced apart and protrude toward the tension retainer 300.

The second seating assembly 580 includes a plurality of second protrusions 583 which are formed in a shape corresponding to a space between a second auxiliary protrusion 582 and a neighboring second auxiliary protrusion 582, and arranged to be equally spaced apart and protrude from the edge of the third hole 301 toward the piston body 100 to be accommodated in the second ring groove 581.

In addition to the embodiment of the present invention described above, various structures as shown in FIGS. 6 to 9 are applicable to the seating unit 500, and a description thereof will be set forth below, mainly of a first seating assembly 590.

For convenience of the description, a view and description of a second seating assembly will be omitted, as the second seating assembly is symmetrical to the first seating assembly 590.

In FIGS. 6 to 9, various shapes of a full line shown under the elliptical area (an enlarged view of section A of FIG. 1) indicated with alternate long and two short dashes line are patterns of the first seating assembly 590 unfolded into a plane.

Figure 6:
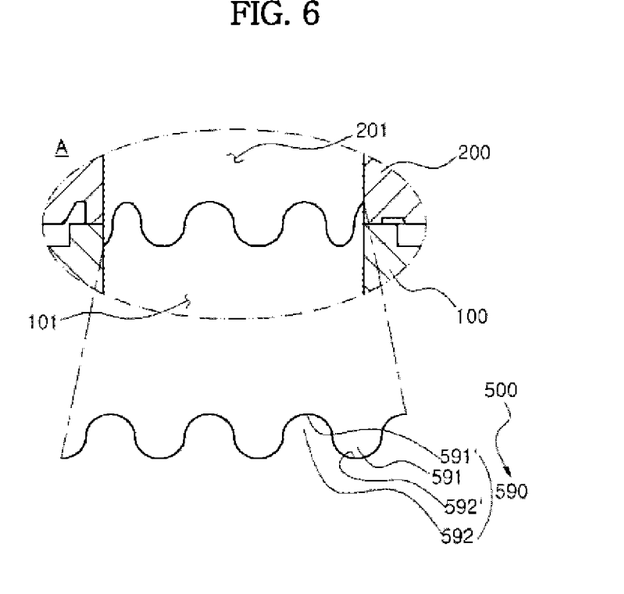
FIGS. 6 to 9 are conceptual cross-sectional views illustrating a first seating assembly of a seating unit which is one of main parts of the piston assembly of a shock absorber according to the various embodiments of the present invention

In one example of the first seating assembly 590, as shown in FIG. 6, the first seating assembly 590 forms a pattern in which a plurality of first protrusions 591 equally spaced apart along the edge of an end of the second rod hole 201 and protruding in a round shape and a plurality of first grooves 591' equally spaced apart and depressed in a round shape are alternately arranged, and the first protrusions 591 are respectively engaged with a plurality of second grooves 592' formed to be depressed in a round shape between a plurality of second protrusions 592 equally spaced apart along the edge of the upper end of the first rod hole 101 and protruding in a round shape.

Figure 7:
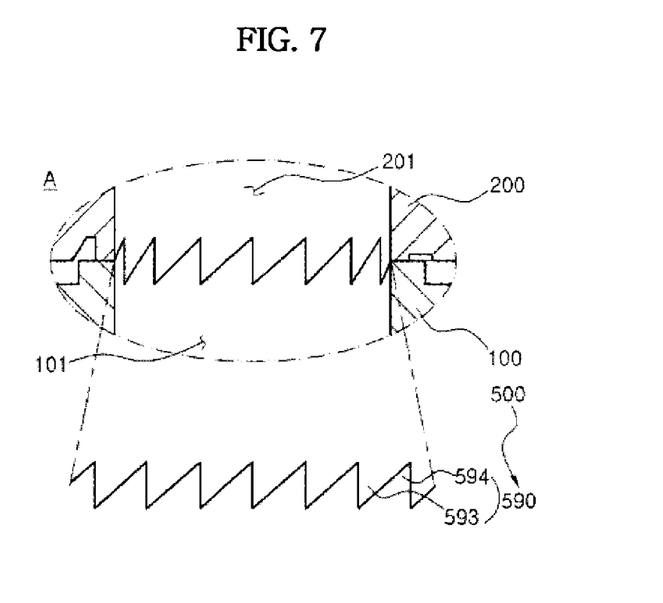

In another example of the first seating assembly 590, as shown in FIG. 7, a plurality of first protrusions 593 arranged along the edge of an end of the second rod hole 201 and protruding in a shape of a triangle inclined in one direction is engaged with a plurality of second protrusions 594 formed along the edge of an end of the first rod hole 101 to correspond to the first protrusions 593.

Figure 8:
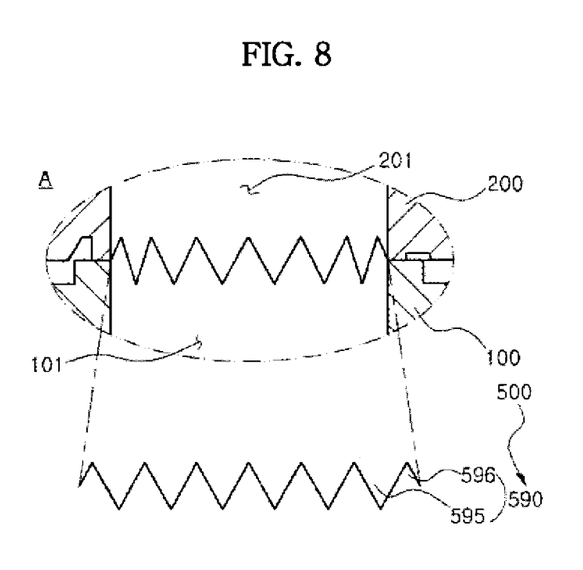

In another example of the first seating assembly 590, as shown in FIG. 8, a plurality of first protrusions 595 arranged along the edge of an end of the second rod hole 201 and protruding in a shape of an isosceles triangle is engaged with a plurality of second protrusions 596 formed along the edge of an end of the first rod hole 101 to correspond to the first protrusions 595.

Figure 9:
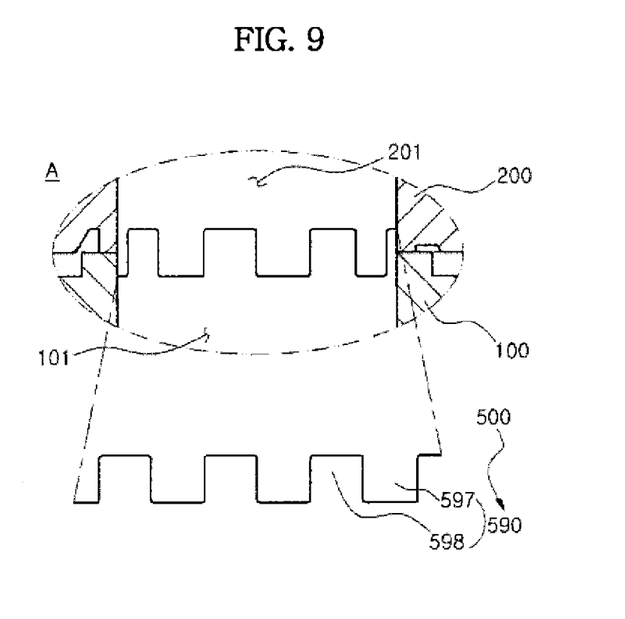

In a further example of the first seating assembly 590, as shown in FIG. 9, a plurality of first protrusions 597 arranged along the edge of an end of the second rod hole 201 and protruding in a shape of a rectangle with two rounded corners is engaged with a plurality of second protrusions 598 formed along the edge of an end of the first rod hole 101 to correspond to the first protrusions 597.

As such, the basic spirit of present invention is to provide a piston assembly of a shock absorber which ensures easy and prompt connection of components in the correct positions in assembling the piston assembly of a shock absorber.

As is apparent from the above description, a piston assembly of a shock absorber according to embodiments of the present invention may ensure easy and prompt connection of components in the correct positions by providing a seating unit between the upper portion of a piston body and a compression retainer and between the lower portion of the piston body and a tension retainer.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A piston assembly of a shock absorber provided on a vehicle, the piston assembly comprising:
    a piston body provided with a center penetrated by a piston rod reciprocating in a cylinder and a repetitive pattern in which a compression fluid passage having an inlet at a lower end thereof and a tension fluid passage having an inlet at an upper end thereof alternately penetrate the piston body, wherein the inlets of the compression fluid passage and the tension fluid passage have larger cross-sectional areas than corresponding outlets of the compression fluid passage and the tension fluid passage, and the compression fluid passage and the tension fluid passage are kept open;
    a compression retainer seated at an upper portion of the piston body and penetrated by a connection hole corresponding to the compression fluid passage;
    a tension retainer seated at a lower portion of the piston body and penetrated by a connection hole corresponding to the tension fluid passage; and
    a seating unit formed between the compression retainer and the piston body and between the piston body and the tension retainer to determine positions at which the compression retainer and the tension retainer are coupled to the piston body,
    wherein the seating unit comprises:
    a first seating assembly provided at an edge of a first rod hole formed at a center of the piston body and penetrated by the piston rod and at an edge of a second rod hole formed at a center of the compression retainer and penetrated by the piston rod, the edge of the second rod hole facing the edge of the first rod hole; and
    a second seating assembly provided at the edge of the first rod hole and at an edge of a third rod hole formed at a center of the tension retainer and penetrated by the piston rod, the edge of the third rod hole facing the edge of a first rod hole, and
    wherein:
    a contact surface of the compression retainer arranged between the second rod hole and the connection hole of the compression retainer to adjoin the piston body is provided with a raised step protruding toward the piston body to have a stepped shape; and
    a contact surface of the tension retainer arranged between the third rod hole and the connection hole of the tension retainer to adjoin the piston body is provided with a raised step protruding toward the piston body to have a stepped shape,
    wherein the first seating assembly comprises:
    at least one first protrusion protruding from the edge of the first rod hole toward the compression retainer;
    a first ring groove depressed along the edge of the second rod hole to accommodate the first protrusion; and
    a plurality of first auxiliary protrusions arranged along the first ring groove to be spaced apart from each other by a distance corresponding to a distance between both ends of the first protrusion and protruding toward the piston body.

2. The piston assembly according to claim 1, wherein the second seating assembly comprises:
    at least one second protrusion protruding from the edge of the first rod hole toward the tension retainer;
    a second ring groove depressed along the edge of the third rod hole to accommodate the second protrusion; and
    a plurality of second auxiliary protrusions arranged along the second ring groove to be spaced apart from each other by a distance corresponding to a distance between both ends of the second protrusion and protruding toward the piston body.

3. The piston assembly according to claim 1, wherein, in the first seating assembly,
    the at least one first protrusion comprises a plurality of first protrusions protruding from the edge of the first rod hole toward the compression retainer.

4. The piston assembly according to claim 1, wherein the second seating assembly comprises:
    a plurality of second protrusions protruding from the edge of the first rod hole toward the tension retainer;
    a second ring groove depressed along the edge of the third rod hole to accommodate the second protrusions; and
    a plurality of second auxiliary protrusions arranged along the second ring groove to be spaced apart from each other by a distance corresponding to a distance between both ends of the second protrusion and protruding toward the piston body.

5. The piston assembly according to claim 1, wherein the second seating assembly comprises:
- a second ring groove depressed along the edge of the first rod hole;
- a plurality of second auxiliary protrusions arranged along the second ring groove to be equally spaced apart and protrude toward the tension retainer; and
- at least one second protrusion formed to have a shape corresponding to a space between neighboring second auxiliary protrusions from the plurality of the second auxiliary protrusions and protruding from the edge of the third rod hole toward the piston body to be accommodated in the second ring groove.

6. The piston assembly according to claim 1, wherein the second seating assembly comprises:
- a second ring groove depressed along the edge of the first rod hole;
- a plurality of second auxiliary protrusions arranged along the second ring groove to be equally spaced apart and protruding toward the tension retainer; and
- a plurality of second protrusions formed to have a shape corresponding to a space between neighboring second auxiliary protrusions from the plurality of the second auxiliary protrusions and protruding from the edge of the third rod hole toward the piston body to be accommodated in the second ring groove.

* * * * *